US011950665B2

(12) United States Patent
Guire

(10) Patent No.: US 11,950,665 B2
(45) Date of Patent: Apr. 9, 2024

(54) PENDANT WITH LOCKING MECHANISM AND INTERCHANGEABLE INSERT RECEIVING PORTION

(71) Applicant: Jerry Guire, Kaila Kona, HI (US)

(72) Inventor: Jerry L Guire, Kaila Kona, HI (US)

(73) Assignee: Jerry Guire, Kailua Kona, HI (US)

( * ) Notice: Subject to any disclaimer, the term of this patent is extended or adjusted under 35 U.S.C. 154(b) by 92 days.

(21) Appl. No.: 17/819,493

(22) Filed: Aug. 12, 2022

(65) Prior Publication Data

US 2023/0092489 A1 Mar. 23, 2023

Related U.S. Application Data

(60) Provisional application No. 63/247,794, filed on Sep. 23, 2021.

(51) Int. Cl.
*A44C 25/00* (2006.01)
*A61G 17/08* (2006.01)

(52) U.S. Cl.
CPC ............ *A44C 25/002* (2013.01); *A61G 17/08* (2013.01)

(58) Field of Classification Search
CPC ...... A44C 25/004; A44C 25/002; A61G 17/08
See application file for complete search history.

(56) References Cited

U.S. PATENT DOCUMENTS 203,425 A * 5/1878 Cox ..................... A44C 25/004 63/19
958,983 A * 5/1910 Wakefield ............ A44C 25/004 220/DIG. 26
4,224,364 A 9/1980 Hunt
4,796,442 A 1/1989 Sarcona
5,158,174 A * 10/1992 Hereford .............. A44C 25/002 63/3
5,208,957 A * 5/1993 Hereford ................ A61G 17/08 206/37
5,228,316 A 7/1993 Meyrowitz
5,755,116 A * 5/1998 Sparacino .............. A44C 5/003 63/3
5,950,287 A * 9/1999 Cacciatore ............. A61G 17/08 40/655
6,557,375 B1 5/2003 Simmons et al.
7,409,837 B2 8/2008 Smith
8,281,465 B1 10/2012 Miraldi
8,371,141 B2 2/2013 Richmond
8,387,412 B2 3/2013 O'Byrne
8,596,090 B1 12/2013 Smith
8,875,542 B2 11/2014 Severs
9,165,447 B2 10/2015 Jenkins et al.
9,398,792 B2 7/2016 Liao
(Continued)

*Primary Examiner* — William L Miller

(74) *Attorney, Agent, or Firm* — Culpepper IP, LLLC; Kerry S. Culpepper

(57) ABSTRACT

A pendant includes a face plate and back plate for defining an internal chamber. When key portions on the face plate are positioned over key entrances of the back plate, and the face plate rotated with respect to the back plate so that the key portions rest on a top surface of the second portion of the grooves in the back plate, the pendant enters a primary locked position. When the latch of the face plate is positioned between two protruding portions of the back plate and resting on a seat location, the pendant enters a secondary locked position.

20 Claims, 15 Drawing Sheets
(7 of 15 Drawing Sheet(s) Filed in Color)

(56) References Cited

U.S. PATENT DOCUMENTS

| | | | | |
|---|---|---|---|---|
| 9,433,266 | B2 | 9/2016 | Meisenbach | |
| 9,826,804 | B1 | 11/2017 | Pereival | |
| 10,136,689 | B1 | 11/2018 | Pandolfino | |
| 10,191,291 | B2 | 1/2019 | Dholakiya | |
| 10,485,310 | B2 | 11/2019 | Harris et al. | |
| 10,603,238 | B1 * | 3/2020 | Yakovleva | A61G 17/007 |
| 11,234,497 | B2 * | 2/2022 | Hinds | A44C 9/0023 |
| 11,490,698 | B2 * | 11/2022 | Derrig | B23K 1/0008 |
| 2001/0017040 | A1 | 8/2001 | Tseng | |
| 2004/0045316 | A1 | 3/2004 | Naor | |
| 2006/0090342 | A1 | 5/2006 | Tope et al. | |
| 2007/0234757 | A1 | 10/2007 | Sherman | |
| 2010/0212355 | A1 * | 8/2010 | Elhaj | A61G 17/08 27/1 |
| 2010/0275649 | A1 * | 11/2010 | Eggleston | A44C 25/002 63/4 |
| 2010/0300146 | A1 | 12/2010 | Clecka | |
| 2013/0239612 | A1 | 9/2013 | Kingsbury et al. | |
| 2015/0089976 | A1 | 4/2015 | Alulis et al. | |
| 2015/0143847 | A1 | 5/2015 | Weems et al. | |
| 2015/0173471 | A1 | 6/2015 | Weems et al. | |
| 2016/0324278 | A1 * | 11/2016 | Gobbato | A44C 25/002 |
| 2017/0099916 | A1 | 4/2017 | Burr | |
| 2017/0215533 | A1 * | 8/2017 | Davis | A44C 25/004 |
| 2017/0236461 | A1 | 8/2017 | Sullivan et al. | |
| 2017/0317705 | A1 * | 11/2017 | Duneier | G06F 1/1637 |
| 2022/0386748 | A1 * | 12/2022 | Parris | A44C 25/004 |

* cited by examiner

PENDANT WITH LOCKING MECHANISM AND INTERCHANGEABLE INSERT RECEIVING PORTION

CROSS-REFERENCE TO RELATED APPLICATIONS

The present application claims the benefit of U.S. Provisional Patent Application No. 63/247,794 filed on Sep. 23, 2021, the contents of which are incorporated herein by reference.

The present application incorporates by reference the contents of: US Patent Publication No. 2017/0099916 to Deborah Burr; and U.S. Pat. No. 5,228,316 to Scott B. Meyrowitz.

TECHNICAL FIELD

The technical field relates generally to jewelry such as pendants and lockets, and, more particularly, to a pendant with an interchangeable insert and a lock that can be used as locket.

BACKGROUND

A pendant is a piece of jewelry that can be generally attached to a necklace or chain.

A locket is a type of pendant that includes a case for holding important items such as, for example, items of sentimental value such as ashes of departed loved ones. A person may wear the locket around the person's neck on a necklace or chain. The case may be ornamental and made of a precious metal.

SUMMARY

The item itself in a pendant can itself be a decorative item having its own case. It is advantageous if the pendant can include a display portion for displaying the decorative item.

The pendant can have a decorative appearance and be made of a precious metal such as gold, silver, titanium, anodized aluminum or a plastic such as resin composite. A person may wish to change the item within the pendant if it has the display portion.

However, a conventional pendant cannot be used to display different items because it is not designed to have an interchangeable insert. Rather, since the items in a conventional pendant usually have extremely high sentimental value, the pendant is permanently sealed so that the item in the pendant is not lost.

Accordingly, conventional pendants also do not have a locking mechanism that can be easily unlocked and locked by a user to interchange inserts. Further, conventional pendants require a chain to have a clasp to be worn.

Reference numerals are included below in the summary for discussion purposes only and not to limit the invention scope. In view of the above problems, as well as other concerns, the present disclosure concerns a pendant (100) comprising a face plate (200) and a back plate (300).

The face plate (200) includes a circumferential wall (202) extending from a rear side in a thickness direction perpendicular from the face plate and including a beveled edge surface (212). The circumferential wall (202) includes a plurality of key portions (210) protruding toward the interior of the face plate (200), each of the plurality of key portions (210) offset by a predetermined angle. The face plate (200) includes a face plate bail (220) having: a base (222) extending outwardly from the face plate (200) and including a varying width; two protruding portions (224) protruding in the thickness direction; a rod (226) disposed in holes (228) of the two protruding portions (224); a bushing (230) on the rod (226) between the two protruding portions (224); a latch (232) fixed on the bushing (230) between the two protruding portions (224); and a bump (234) disposed on a narrower portion of the base (22) than the two protruding portions (224) and closer to the face plate (200) than the two protruding portions (224).

The back plate (300) includes: a first circumferential wall (302) defining an inner chamber; a second circumferential wall (304) having a diameter greater than the first circumferential wall (302) and a height less than that of the first circumferential wall to define a beveled edge surface (307); and an O-ring (310) resting on the beveled edge surface (307). An outer portion of the first circumferential wall (302) above the second circumferential wall (304) includes a plurality of grooves (306), wherein the plurality of grooves includes key entrances (308) offset by the predetermined angle; wherein each of the plurality of grooves (306) has a first portion (3062) in which the thickness decreases from the key entrance (308) and a second portion (3064) connected to the first portion, the second portion (3064) having a greater thickness than a point of connection with the first portion (3062). The back plate (300) includes a back plate bail (312) having: a base (314) extending outwardly from the second circumferential wall (304) of the back plate (300) and including a varying width; two protruding portions (316) protruding outwardly from the base (314) positioned to provide a seat location (318) for the latch (232); and a bump (320) disposed closer to the back plate (300) than the two protruding portions (316). The key portions (210) on the circumferential wall (202) of the face plate (200) are positioned to match the positions of the key entrances (308) of the plurality of grooves (306) on the back plate.

When the key portions (210) on the face plate (200) are positioned over the key entrances (308) of the back plate (300), and the face plate (200) is rotated with respect to the back plate (300) so that the key portions (210) rest on a top surface of the second portion (3064) of the grooves (306), the pendant enters a primary locked position.

When the latch (232) is positioned between the two protruding portions (316) of the back plate (300) and resting on the seat location (318), the pendant enters a secondary locked position.

The pendant (100) can include a circular pillbox (400) having a diameter less than a diameter of the interior chamber of the back plate (300). The pillbox (400) includes a top cover portion (402) with a circumferential wall (406) extending therefrom; a lower cover portion (404) defining an internal chamber with the top cover potion (402), the lower cover portion including a circumferential wall (410) having a diameter less than the diameter of the circumferential wall of the top cover portion; and a plurality of key portions (408) on the circumferential wall (406) of the top cover portion protruding toward an interior, each of the plurality of key portions (408) offset by a second predetermined angle; and wherein the lower cover portion (404) includes a plurality of grooves (414) on the circumferential wall (410), wherein the plurality of grooves (404) includes insert key entrances (412) offset by the second predetermined angle, wherein when the key portions (408) are positioned over the key entrances (412), and the top cover portion rotated with respect to the lower cover portion so that the key portions (408) of the top cover portion rest on a top surface of the grooves (404), the pillbox enters a locked position.

According to a second embodiment, the circumferential wall (202) of the face plate (200) includes a first circumferential step (206) extending from an interior of the circumferential wall toward a center of the face plate (200) and a second circumferential step (208) extending from an interior of the circumferential wall (202) toward the center of the face plate to define an opening display portion on a front side of the face plate (200) and a seat on a rear side, the second circumferential step (208) extending further to the interior than the first circumferential step (206).

It should be noted that all or some of the aspects of the embodiments can be combined.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.

DETAILED DESCRIPTION

Figure 1A:
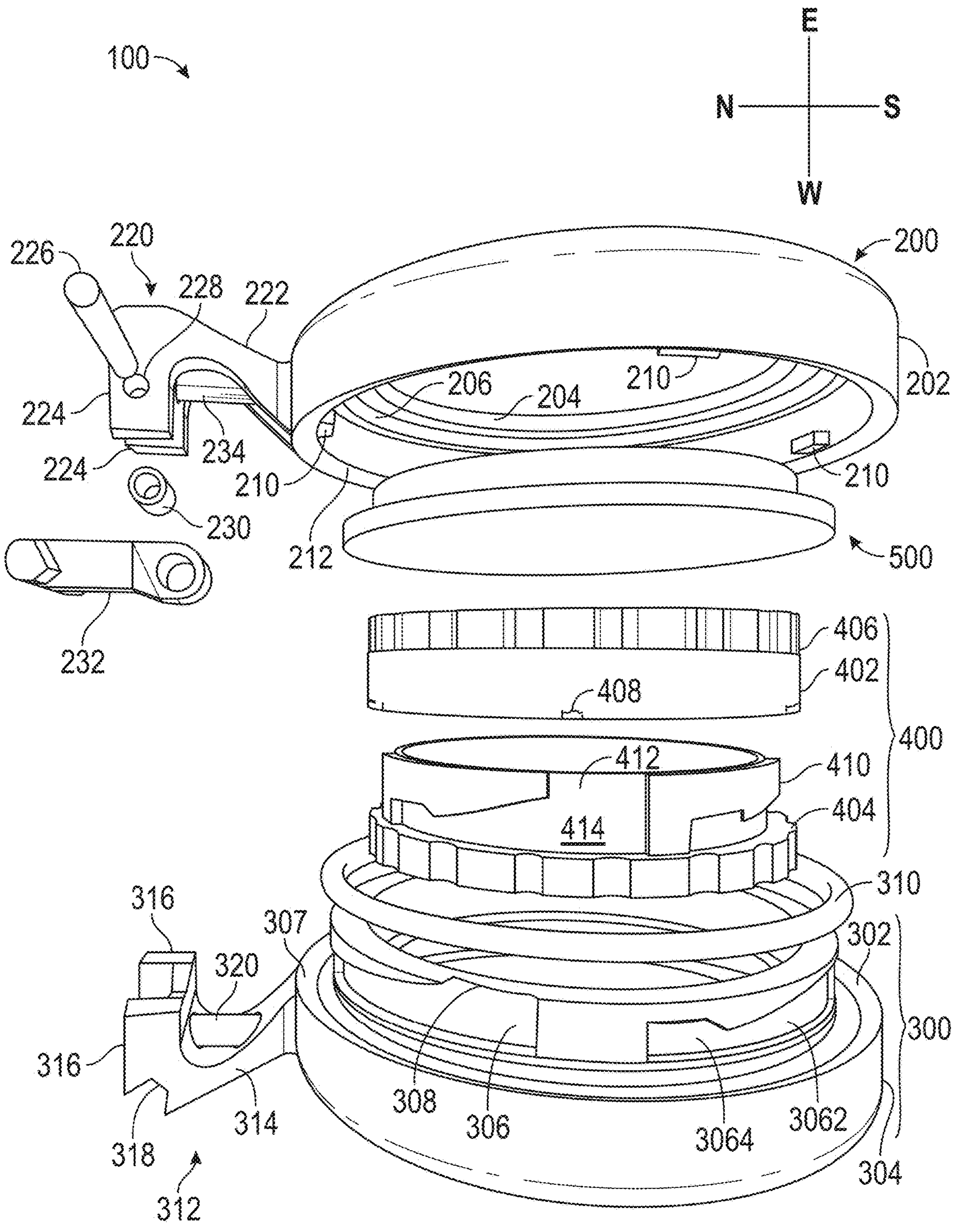
FIG. 1A is an exploded view of a pendant according to an exemplary embodiment.

In overview, the present disclosure concerns jewelry such as pendants and lockets, and, more particularly, to a pendant with an interior space for an insert and/or pillbox and a lock that can be used as locket.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Reference will now be made in detail to the accompanying drawings in which a pendant 100 according to an exemplary embodiment will be discussed. Wherever possible, the same reference numbers will be used throughout the drawings to refer to the same or like parts.

As shown in FIGS. 1A-1B, 9 and 15, the pendant 100, 1500 includes a face plate 200 and a back plate 300. The pendant 100 can include interchangeable items such as a pillbox 400 and an insert 500 therein. The pillbox 400 is a case for carrying important items such as ashes of departed loved ones. The insert 500 can have a fancible design such as the insert 1300 shown in FIG. 13. Further, the insert can be shown through the face plate 200 as discussed below and shown by the exemplary pendant 1200 in FIG. 12.

The Face Plate

Figure 1B:
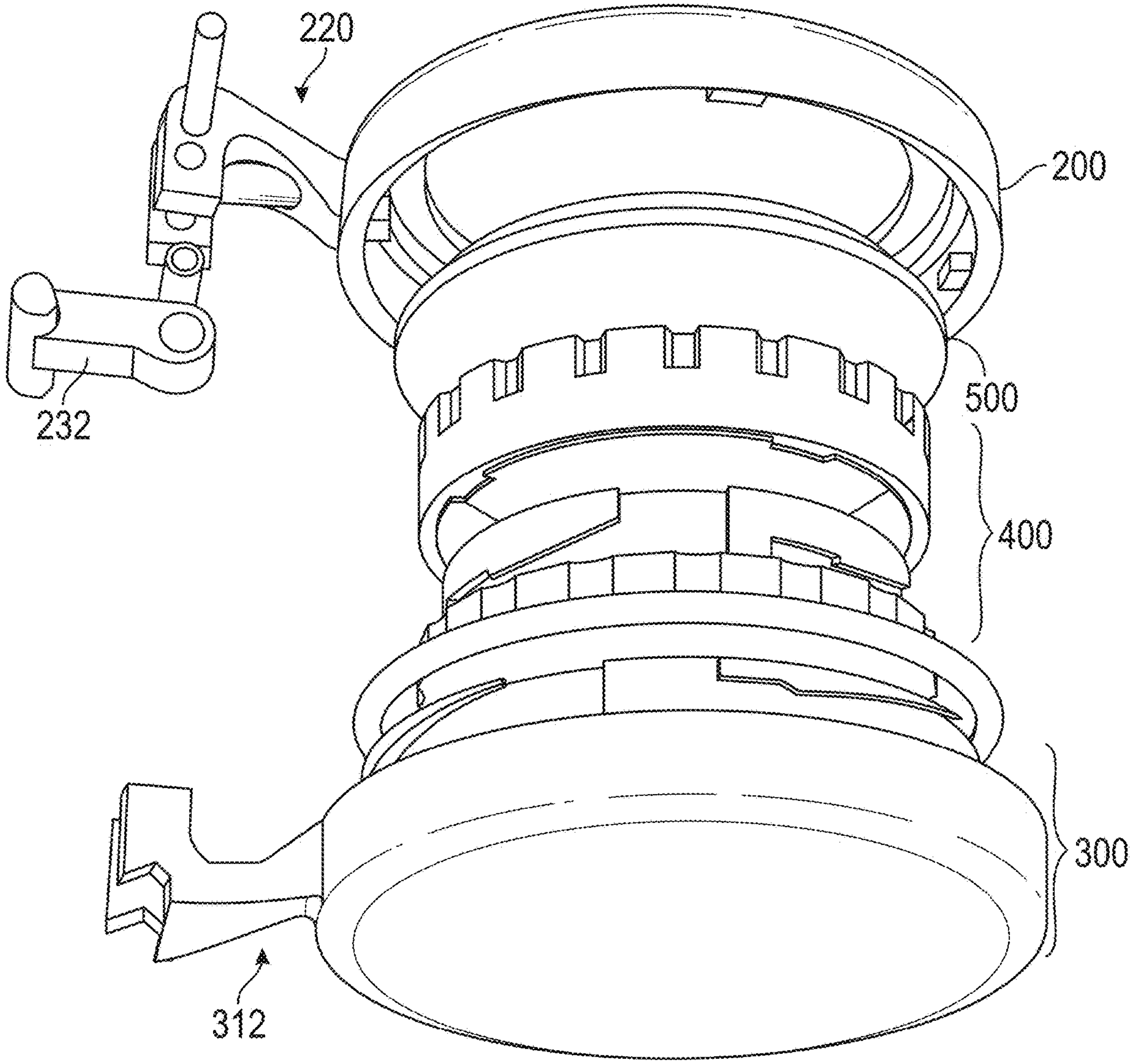
FIG. 1B is a bottom perspective exploded view of the pendant.
Figure 2:
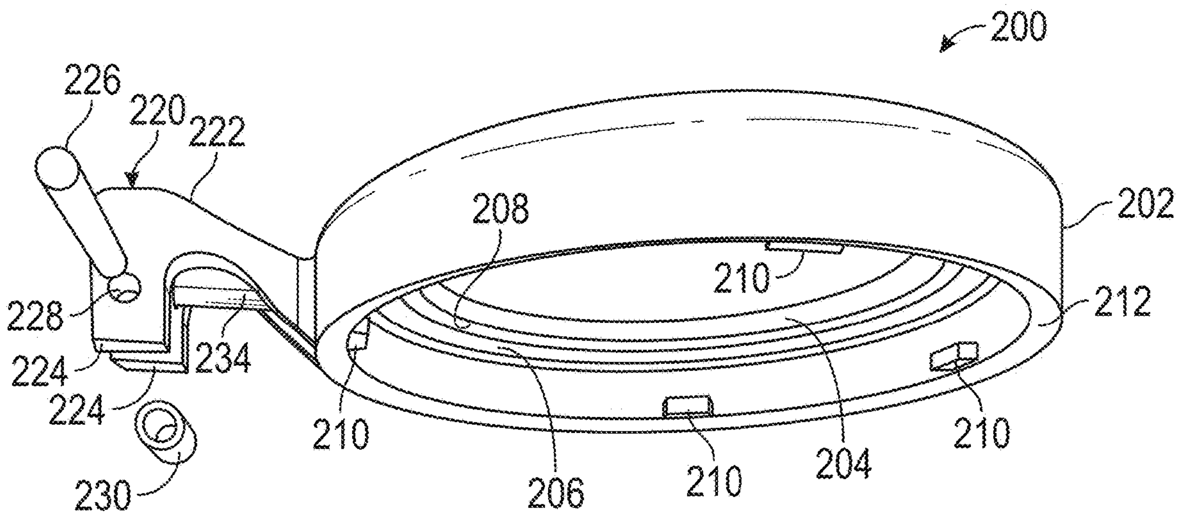
FIG. 2 is a bottom perspective view of the face plate.
Figure 14A:
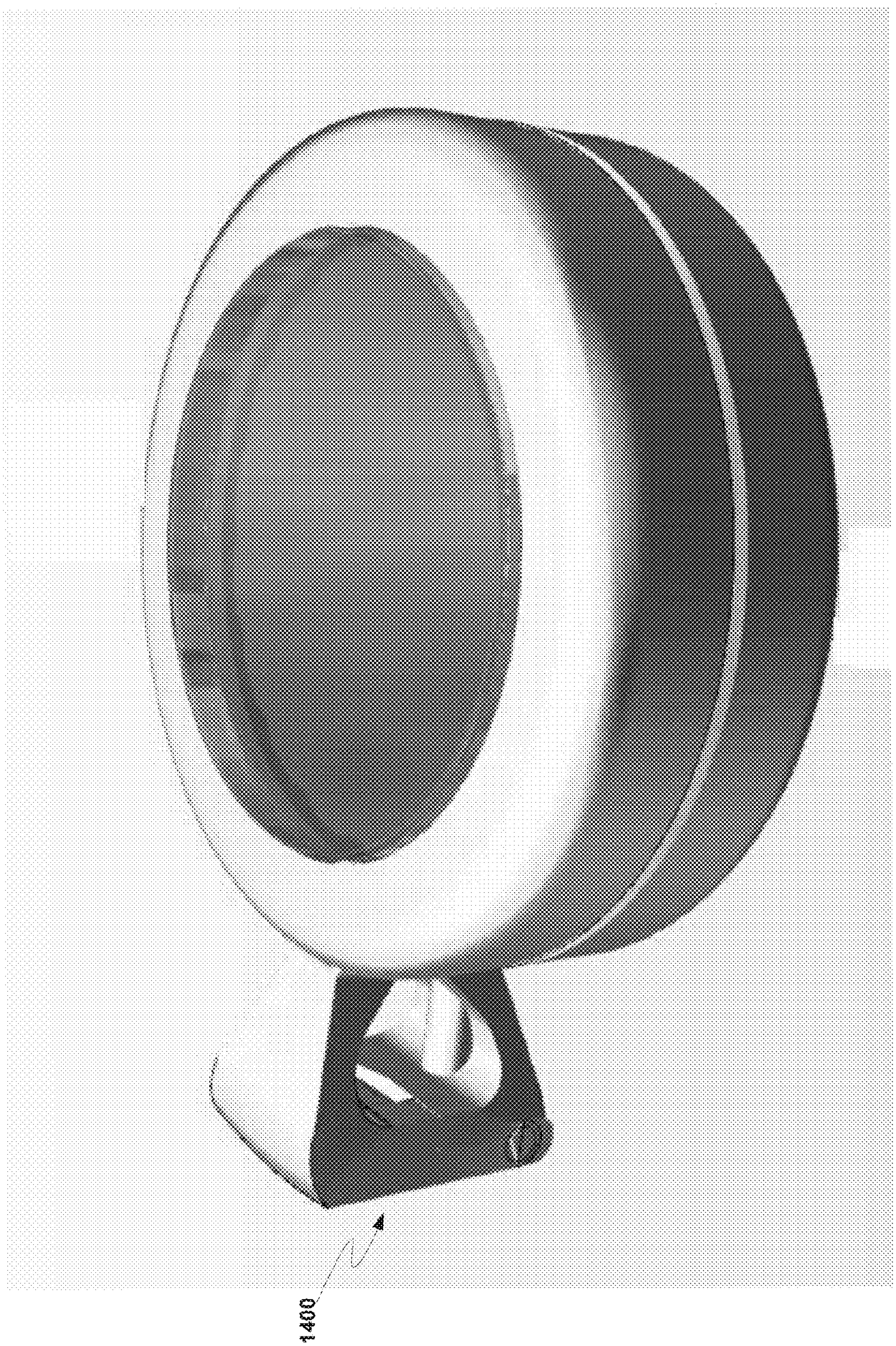
FIG. 14A is a top perspective 3D color rendering of the pendant in an assembled and locked state.

Referring to FIGS. 1A-1B and 2, the face plate 200 includes a circumferential wall 202 extending from a rear side of the face plate in a thickness direction. A thickness direction refers to a direction perpendicular to the face plate 200 or east to west as shown in the legend of FIG. 1A. The circumferential wall 202 includes first and second circumferential steps 204, 206 extending from the inner surface toward the interior of the face plate (or north to south as shown in the legend). The first circumferential step 204 extends further to the interior than the second circumferential step 206 to define an opening display portion of the face plate 200 and a seat 208 on the face plate's rear side. The opening display portion is shown also in the pendant 1400 in FIG. 14A.

The circumferential wall 202 includes four key portions 210 below the first and second circumferential steps 204, 206. The key portions 210 protrude towards the interior of the face plate and are offset from each other by a predetermined angle. For example, if there are four key portions 210 the predetermined angle can be 90 degrees. The circumferential wall 202 includes a beveled edge surface 212 below the key portions 210.

The face plate 200 includes a face plate bail 220 extending outwardly. The face plate bail 220 includes a face plate base 222, two protruding portions 224 protruding in the thickness direction (east to west), a rod 226 disposed in holes 228 of the two protruding portions 224, a bushing 230 disposed on the rod 226 between the two protruding portions 224, a latch 232 fixed on the bushing 230 between the two protruding portions 224.

The width of the base 222 in the thickness direction varies in the extending direction from the circumferential wall 202. A bump 234 is disposed on a portion of the base 222 that is narrower than the two protruding portions 224 and closer to the circumferential wall 202 than the two protruding portions 224.

The Back Plate

Figure 3:
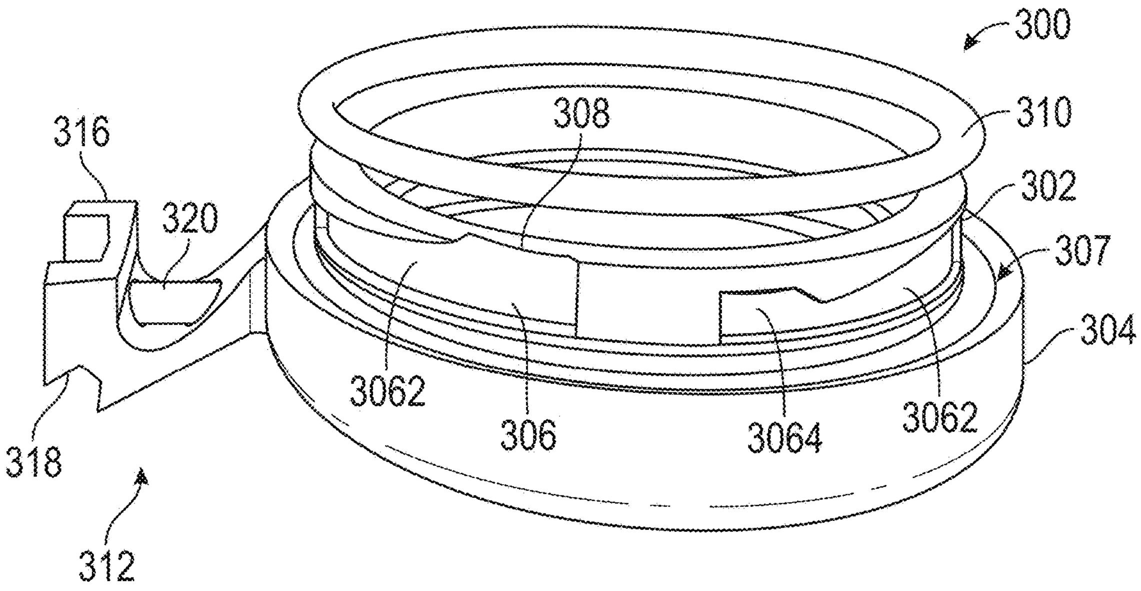
FIG. 3 is a top perspective view of the back plate.

Referring to FIG. 3, the back plate 300 includes a first circumferential wall 302 defining an inner chamber of the pendant for receiving interchangeable items (such as pillbox 400) and a second circumferential wall 304 connected to the first circumferential wall 302.

The first circumferential wall 302 includes a plurality of key entrances 308 on an outer portion offset by the predetermined angle to engage with the key portions 210 of the face plate 200 and enter the pendent 100 in a primary locking position as discussed later. The plurality of key entrances 308 respectively lead to grooves 306 on the outer portion of the first circumferential wall 302. Each of the plurality of grooves 306 includes a first portion 3062 in which the thickness decreases from the key entrance 308 and a second portion 3064 connected to the first portion 3062 that has a greater thickness than a point of connection with the first portion 3062.

The second circumferential wall 304 has a diameter greater than a diameter of the first circumferential wall 302 and a height less than that of the first circumferential wall 302 to define a beveled edge surface 307. An O-ring 310 rests on the beveled edge surface 307.

The back plate 300 includes a back plate bail 312 extending outwardly from the second circumferential wall 304. The back plate bail 312 includes a base 314 extending outwardly from the second circumferential wall 304 and two protruding portions 316 protruding outwardly from the base 314. The two protruding portions 316 include indentions on bottom portions that provide a seat location 318 for the latch 232. The base includes a bump 320 disposed closer to second circumferential wall 304 than the two protruding portions 316. The thickness of the base 312 varies in the extending direction outwardly from the second circumferential wall 304. The area defined by the bumps 320, 234 can provide a no slip snug passage for a necklace if desired.

Figure 15:
FIG. 15 is an exploded perspective 3D color rendering of the pendant.

The arrangement of the parts such as the O-ring is shown by the exploded view of the exemplary pendant 1500 in FIG. 15.

Pendent in Primary Locking Position

The key portions 210 on the circumferential wall 202 of the face plate 200 are positioned to match the positions of the key entrances 308 on the back plate 300. The face plate 200 is rotated with respect to the back plate 300 so that the key portions 210 of the face plate 200 enter the grooves 306 and move through the first portion 3062 and rest on a top surface of the second portion 3064.

Pendent in Secondary Locking Position

Figure 7:
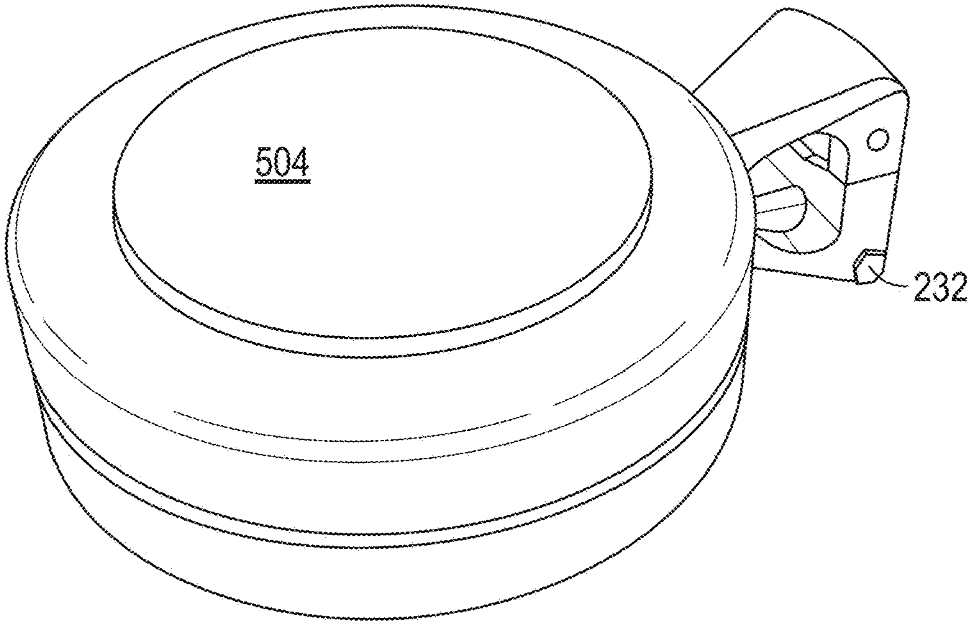
FIG. 7 is perspective view of the pendant assembled.
Figure 8:
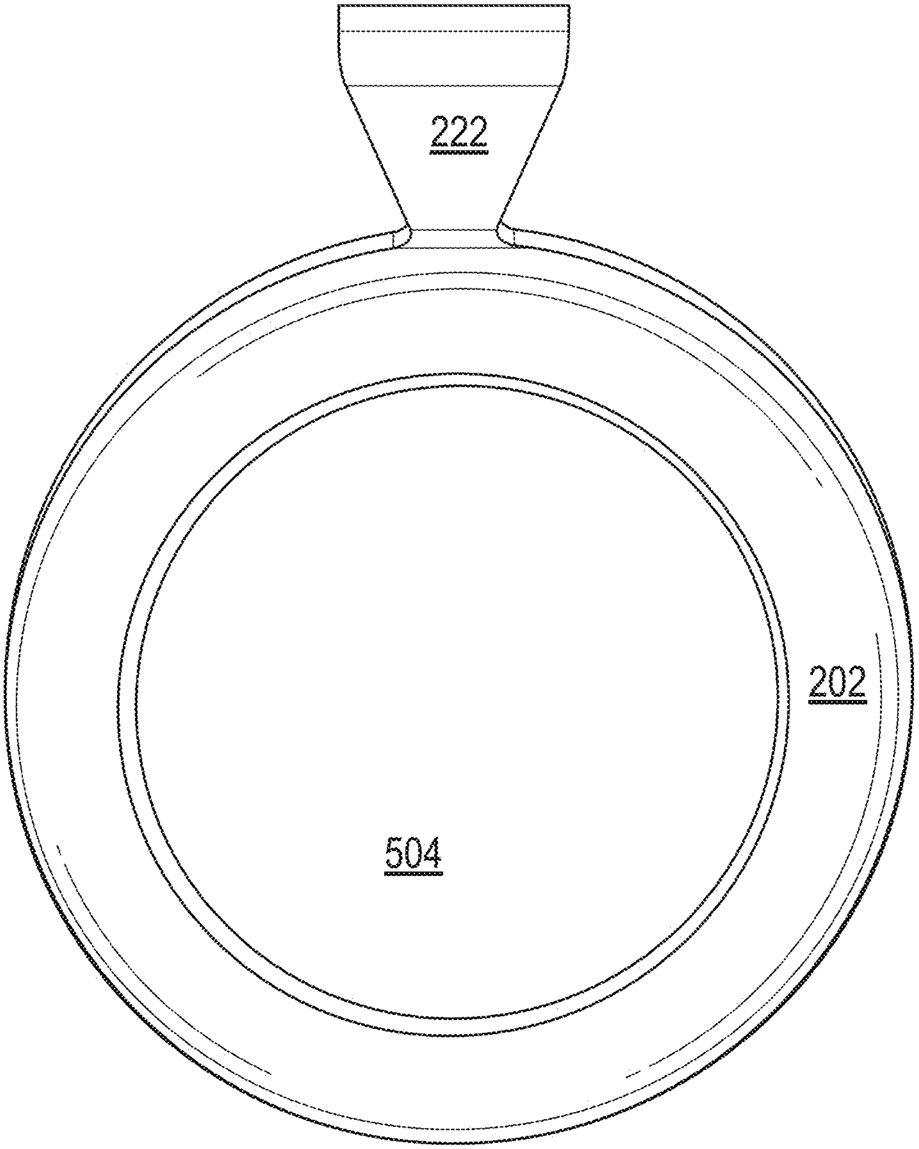
FIG. 8 is a top view of the pendant.
Figure 14B:
FIG. 14B is a bottom perspective 3D color rendering of the pendant in an assembled and locked state.

After the pendant 100 has entered the primary locking position, the latch 232 is rotated downward to be positioned between the two protruding portions 316 of the back plate bail 312 and rest on the seat location 318. Referring to FIG. 7, the latch 232 is shown resting on the seat locations. Referring also to the exemplary pendant 1400 in FIGS. 14A-14B, the pendant is in the secondary locking position.

Pillbox

Figure 4:
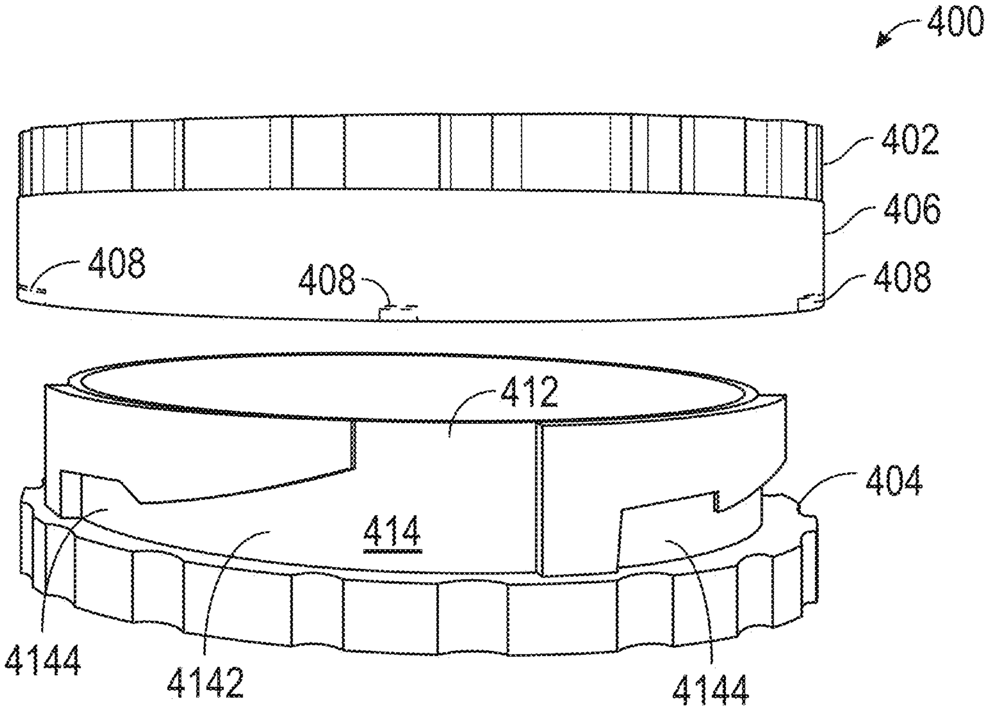
FIG. 4 is a side perspective view of the pillbox.

Referring to FIG. 4, the pendant 100 can include a circular pillbox 400. The pillbox 400 has a diameter less than a diameter of the interior chamber of the back plate 300 defined by the first circumferential wall 302. The pillbox 400 includes a top cover portion 402 and lower cover portion 404. A diameter of the lower cover portion 404 is less than a diameter of the top cover portion 402 to define an internal chamber for storing an important item.

The top cover portion 402 includes a top circumferential wall 406 extending from a rear side in the thickness direction (east to west as shown in the legend of FIG. 1A). The top circumferential wall 406 includes four key portions 408 protruding inwardly and offset from each other by a predetermined angle such as 90 degrees.

The lower cover portion 404 includes a lower circumferential wall 410 extending from a top side in the thickness direction. The lower circumferential wall 410 includes a plurality of key entrances 412 offset by the predetermined angle to engage with the key portions 408 of the top cover portion 402. The plurality of key entrances 412 respectively lead to grooves 414 on the outer portion of the lower circumferential wall 410. Each of the plurality of grooves 414 includes a first portion 4142 in which the thickness decreases from the key entrance 412 and a second portion 4144 connected to the first portion 4142 that has a greater thickness than a point of connection with the first portion 4142.

Similarly to the primary locking mechanism of the pendant 100 *o*, when the insert key portions 408 are positioned over the insert key entrances 412, and the top cover portion 402 is rotated with respect to the lower cover portion 404 the key portions 408 engage the grooves 414 so that the pillbox enters a locked position.

Figure 16A:
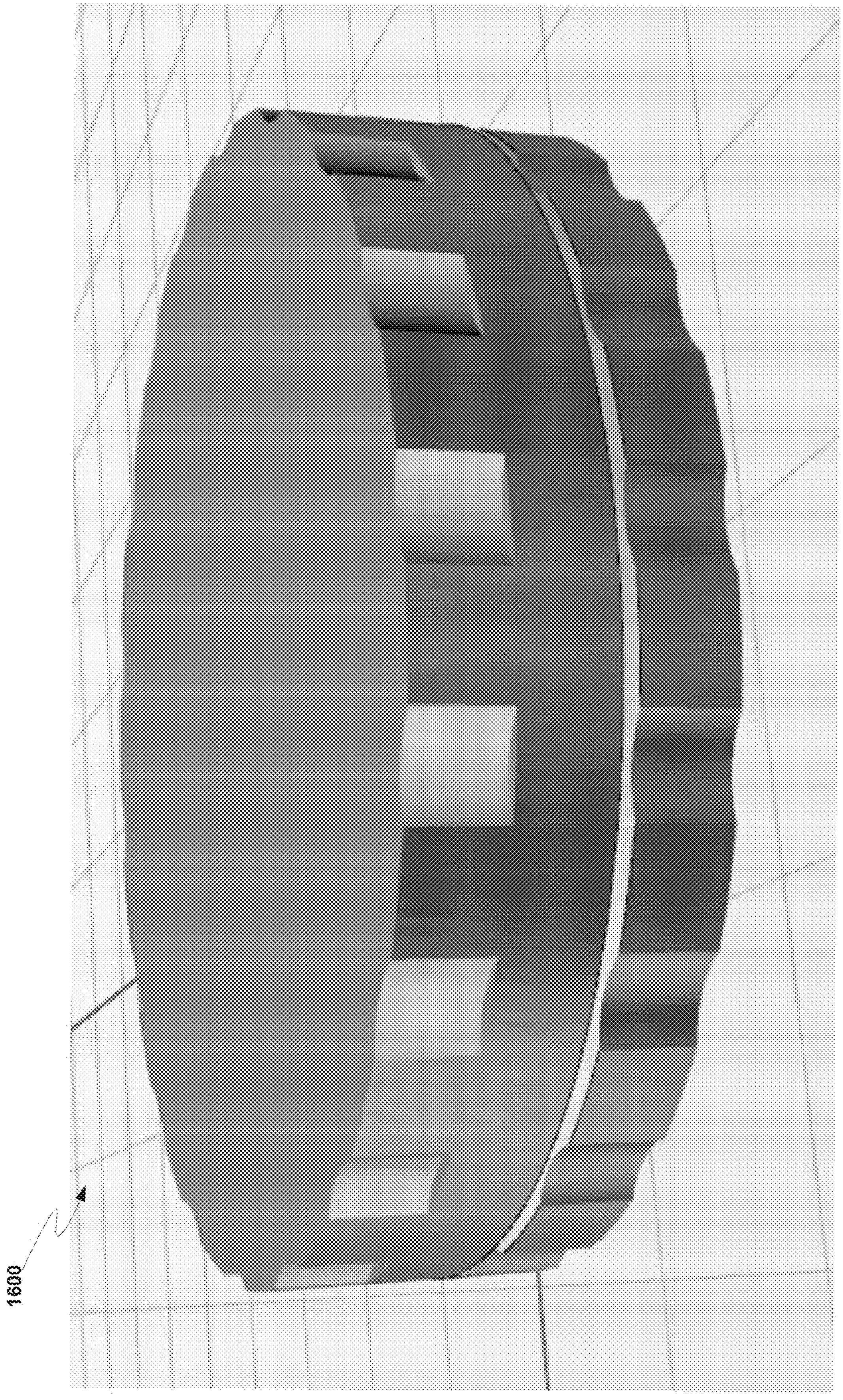
FIG. 16A is a top perspective 3D color rendering of the pillbox in an assembled and locked state.
Figure 16B:
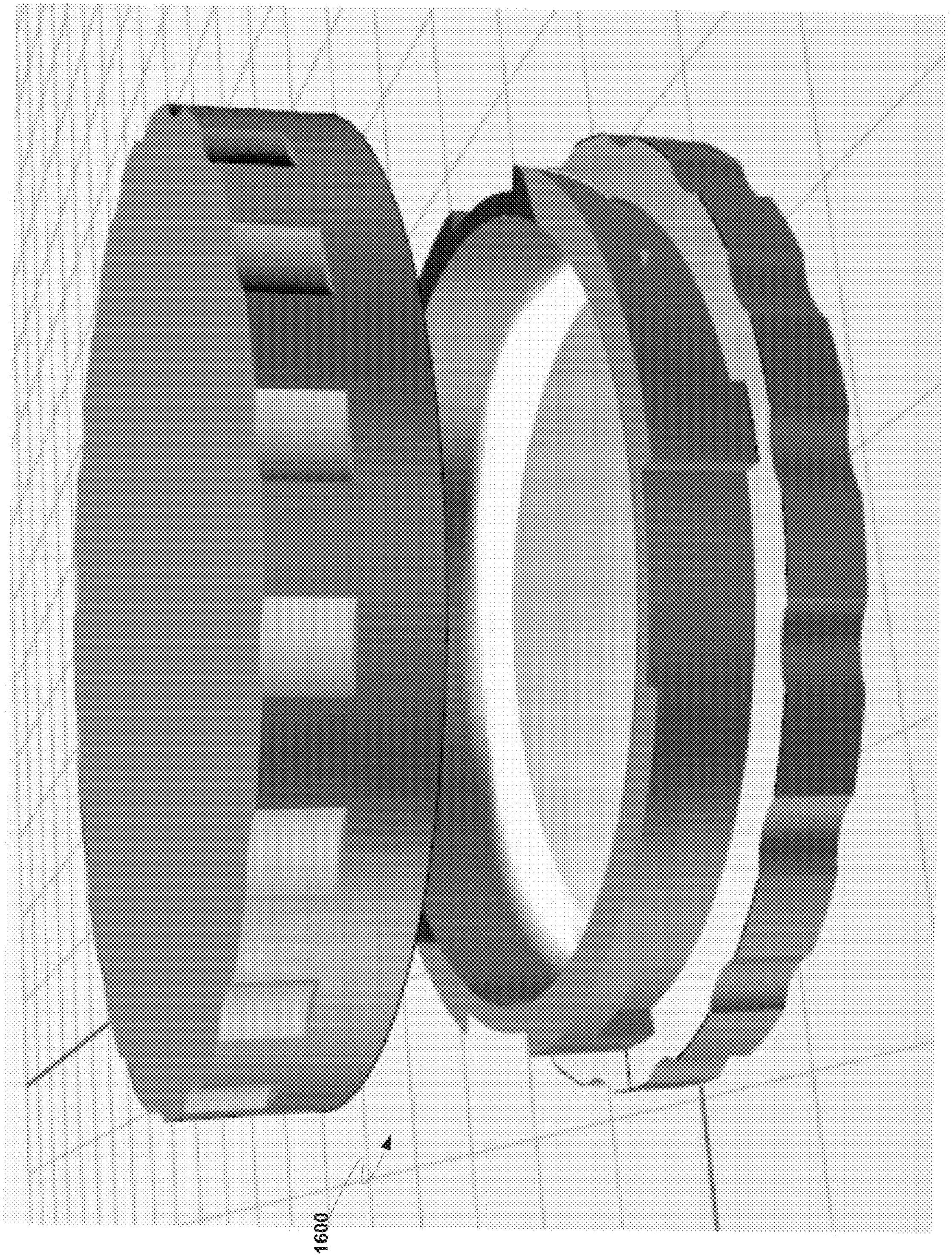
FIG. 16B is an exploded top perspective 3D color rendering of the pillbox.

A pillbox 1660 in locked state is shown in FIG. 16A and in open state in FIG. 16B.

Insert

Figure 5:
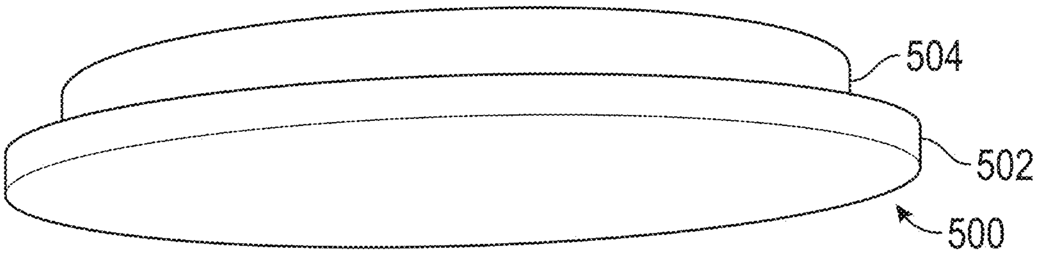
FIG. 5 is a bottom perspective view of the insert.
Figure 6:
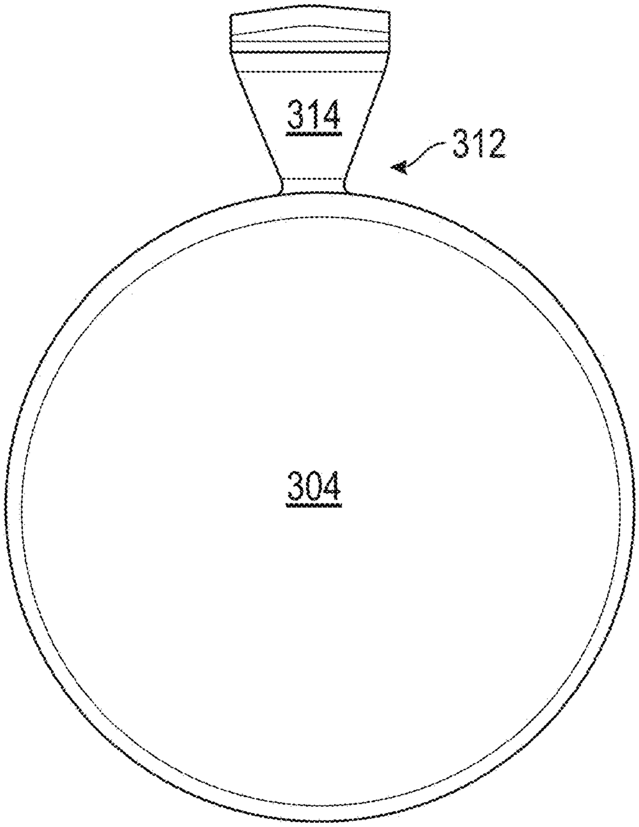
FIG. 6 is a bottom view of the pendant.
Figure 12:
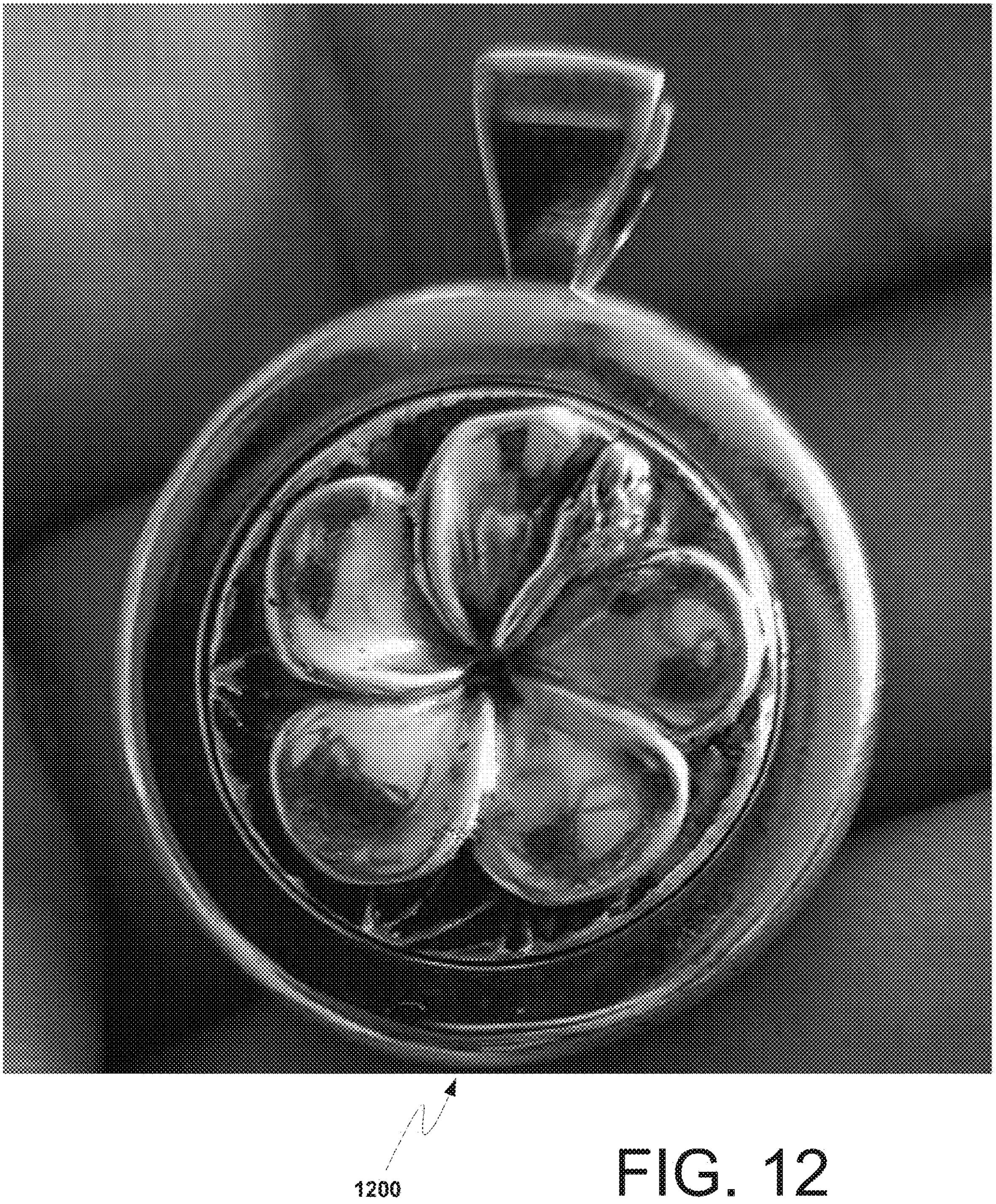
FIG. 12 is a photograph of an exemplary implementation of the pendant with an exemplary interchangeable insert having a hibiscus design.
Figure 13:
FIG. 13 is a photograph of an exemplary interchangeable insert having a design of a tidal wave background.

Referring to FIG. 5, the pendant 100 can include a circular insert 500 for display through the display portion provided by the first circumferential step 204 of the face plate 200. To fit in the face plate 200, the outer diameter of the insert 500 is less than the inner diameter of the face plate 200. The insert can include a base portion 502 of a first diameter and a second portion 504 having a second diameter less than the first diameter and protruding outward in the thickness direction to either protrude through the display portion, be flush with the display portion, etc. The base portion 502 can rest against the seat 208 of the face plate 200. As shown in FIGS. 12-13, the insert 500 can include a colorful or fanciful display to be displayed through the display portion.

Manufacturing

The pendant 100 can be made of metal and by machining or lost wax casting. Alternatively, the pendant 100 can be made of plastic or composite by injection molding or 3D printing.

Modifications

As discussed above, the first circumferential step 204 defines an opening display portion of the face plate 200 and a seat 208 on the face plate's rear side. Accordingly, when the circular insert 500 is inserted on the seat 208 for display, second portion 504 of the insert 500 can protrude through the display portion as shown in FIG. 7. However, rather than displaying the circular insert 500, when the pillbox 400 is inserted in the interior chamber of the back plate 300, the pillbox can be visible through the display portion of the face plate 200.

Figure 9:
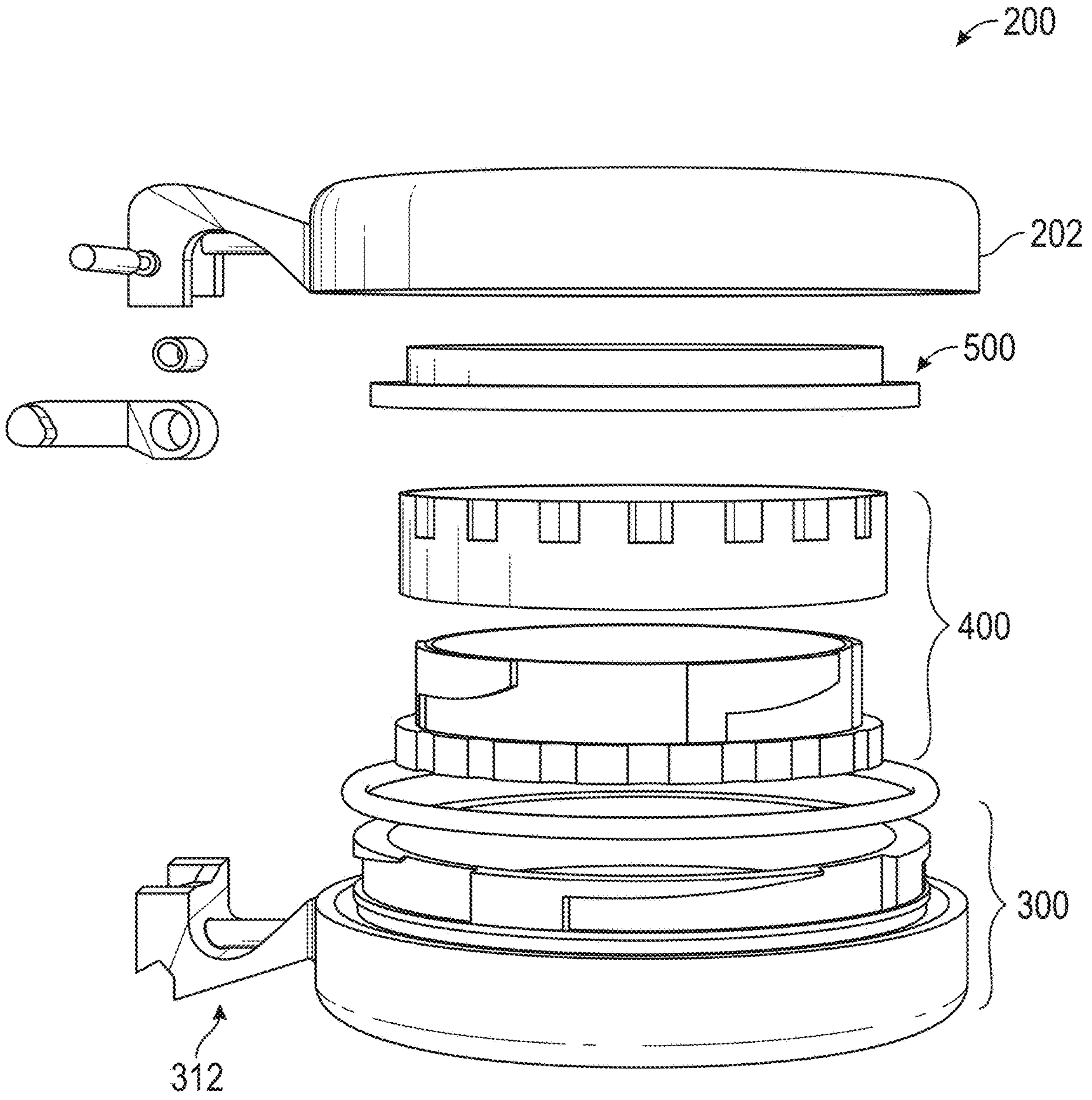
FIG. 9 is an exploded view of the pendant.
Figure 10:
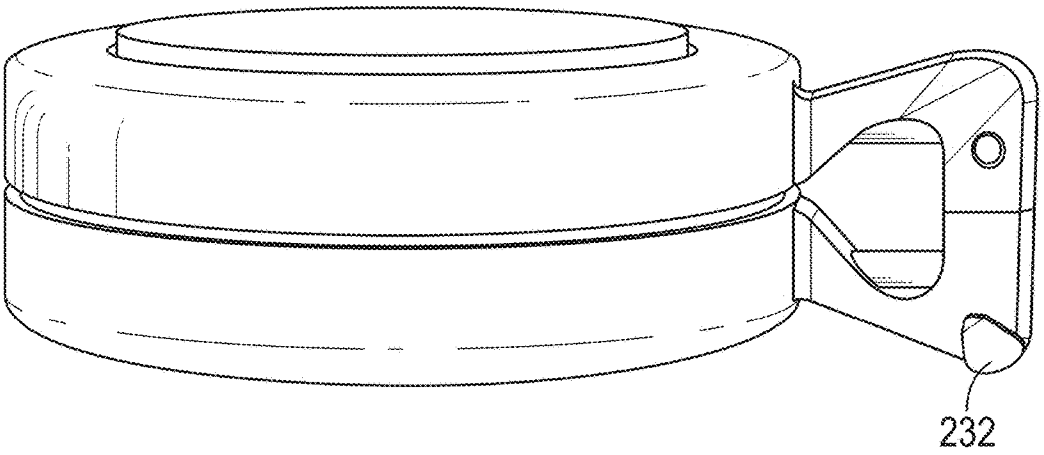
FIG. 10 is a first side perspective view of the pendant.
Figure 11:
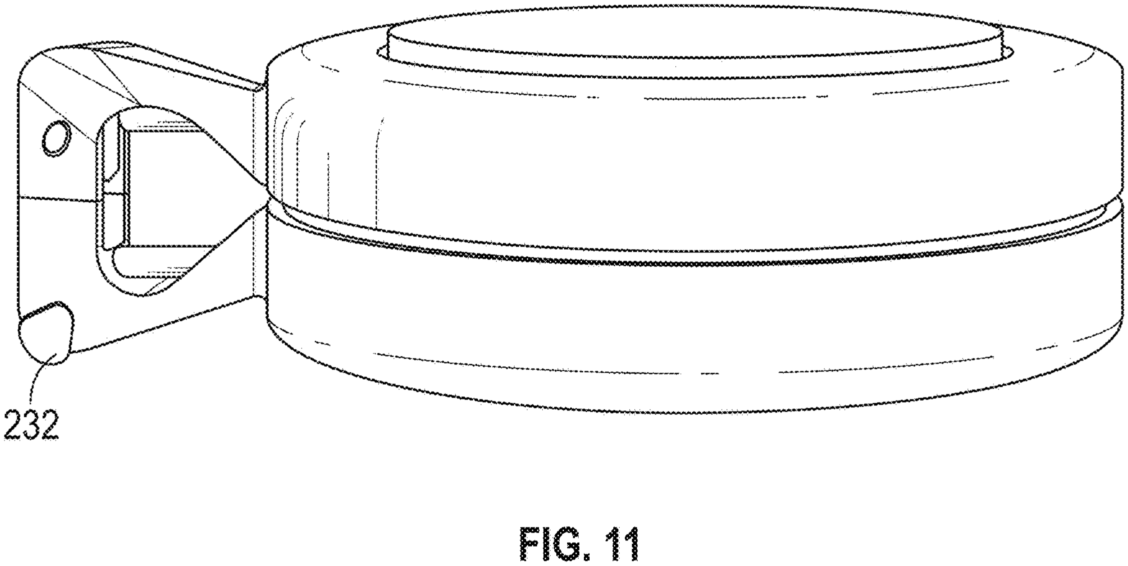
FIG. 11 is a second side perspective view of the pendant.

In FIG. 9, for example, the pillbox 400 and insert 500 are shown as separate items. However, the pillbox and insert could be one item. That is, the pillbox 400 could have the insert 500 as a top portion.

Moreover, rather than the first circumferential step 204 providing a display portion, the face plate 200 can be a solid surface with, for example, its own display.

The number of key portions and entrances is four in the exemplary embodiment. However, the number can be less or greater than four.

While only certain features of the invention have been illustrated and described herein, many modifications and changes will occur to those of ordinary skill in the art. The following claims are intended to cover all such modifications and changes.

What is claimed is:

1. A pendant comprising:
a face plate including:
a circumferential wall extending from a rear side of the face plate in a thickness direction perpendicular to the face plate; and
a plurality of key portions offset on the circumferential wall and protruding toward an interior of the face plate, each of the plurality of key portions offset by a predetermined angle; and
a back plate including a first circumferential wall defining an interior chamber of the pendant, and a second circumferential wall connected to the first circumferential wall, wherein the first circumferential wall includes a plurality of key entrances on an outer portion, each of the plurality of key entrances offset by the predetermined angle to engage with the key portions and enter the pendant in a primary locking position.

2. The pendant of claim 1, further comprising a circular pillbox having a diameter less than a diameter of the interior chamber of the back plate, the circular pillbox comprising:
a top cover portion with a top circumferential wall extending in the thickness direction;
a plurality of key portions on the top circumferential wall and protruding towards interior of the circular pillbox, each of the plurality of key portions offset by a second predetermined angle; and
a lower cover portion defining a pillbox internal chamber with the top cover potion, the lower cover portion including a lower circumferential wall extending in the thickness direction and having a diameter less than the diameter of the top circumferential wall, the lower cover portion including a plurality of grooves and key entrances offset by the second predetermined angle;
wherein when the plurality of key portions are positioned over the key entrances, and the top cover portion rotated with respect to the lower cover portion so that the key portions engage the grooves, the circular pillbox enters a locking position.

3. The pendant of claim 1, further comprising:
a face plate bail including a face plate base extending outwardly from the face plate;
a back plate bail including a back plate base extending outwardly from the second circumferential wall of the back plate and two protruding portions protruding outwardly from the base,
wherein the face plate bail includes:
two protruding portions protruding in the thickness direction,
a rod disposed in holes of the two protruding portions,
a bushing on the rod between the two protruding portions;
a latch fixed on the bushing between the two protruding portions; and
a bump disposed on a narrower portion of the base than the two protruding portions and closer to the face plate than the two protruding portions,
wherein a thickness of the face plate base extending outwardly from the face plate varies in the extending direction,
wherein when the latch is positioned between the two protruding portions of the back plate bail the pendant enters a secondary locked position.

4. The pendant of claim 1, further comprising:
a face plate bail including a base extending outwardly from the face plate; and
a back plate bail including a base extending outwardly from the second circumferential wall of the back plate,
wherein the face plate bail further includes a latch, and
wherein the back plate bail further includes:
two protruding portions protruding outwardly from the base positioned to provide a seat location for the latch; and
a bump disposed closer to the back plate than the two protruding portions,
wherein the base of the back plate bail includes a thickness varying in the outward direction,
wherein when the latch is positioned between the two protruding portions of the back plate bail and resting on the seat location the pendant enters a secondary locked position.

5. The pendant of claim 1, wherein the circumferential wall of the face plate includes a beveled edge surface, the face plate further comprising:
a first circumferential step extending from an interior of the circumferential wall toward the interior of the face plate; and
a second circumferential step extending from the interior of the circumferential wall toward the interior of the face plate to define an opening display portion and a seat on a rear side, the second circumferential step extending further to the interior than the first circumferential step,
wherein the plurality of key portions on the circumferential wall are disposed below the first circumferential step.

6. The pendant of claim 1, wherein:
the second circumferential wall of the back plate has a diameter greater than a diameter of the first circumferential wall of the back plate and a height less than that of the first circumferential wall of the back plate to define a beveled edge surface;
wherein an outer portion of the first circumferential wall above the second circumferential wall includes a plurality of grooves; and
wherein each of the plurality of grooves has a first portion in which the thickness decreases from the key entrance and a second portion connected to the first portion, the second portion having a greater thickness than a point of connection with the first portion.

7. The pendant of claim 6, wherein the back plate further comprises an O-ring resting on the beveled edge surface.

8. The pendant of claim 6, wherein when the key portions are positioned over the key entrances, and the face plate is rotated with respect to the back plate so that the key portions rest on a top surface of the second portion of the grooves, the pendant enters the primary locked position.

9. The pendant of claim 1, wherein the pendant is made of metal.

10. The pendant of claim 1, wherein the pendant is made by lost wax casting.

11. The pendant of claim 1, wherein the pendant is made of plastic.

12. The pendant of claim 1, wherein the pendant is made by injection molding.

13. The pendant of claim 1, wherein the pendant is made by machining or 3D printing.

14. The pendant of claim 1, wherein the pendant is made of composite resin or carbon fiber.

15. A pendant comprising:

a face plate including:
a circumferential wall extending from a rear side of the face plate in a thickness direction perpendicular from the face plate and including a beveled edge surface;
a first circumferential step extending from an interior of the circumferential wall toward a center of the face plate;
a second circumferential step extending from the interior of the circumferential wall toward the center of the face plate to define an opening display portion on a front side of the face plate and a seat on a rear side, the second circumferential step extending further to the interior than the first circumferential step;
a plurality of key portions on the circumferential wall protruding toward the interior of the face plate and disposed below the first circumferential step, each of the plurality of key portions offset by a predetermined angle;
a face plate bail including:
a base extending outwardly from the face plate and including a varying width;
two protruding portions protruding in the thickness direction;
a rod disposed in holes of the two protruding portions;
a bushing on the rod between the two protruding portions;
a latch fixed on the bushing between the two protruding portions; and
a bump disposed on a narrower portion of the base than the two protruding portions and closer to the face plate than the two protruding portions;
a back plate including:
a first circumferential wall defining an inner chamber;
a second circumferential wall having a diameter greater than the first circumferential wall and a height less than that of the first circumferential wall to define a beveled edge surface;
an O-ring resting on the beveled edge surface;
wherein an outer portion of the first circumferential wall above the second circumferential wall includes a plurality of grooves, wherein the plurality of grooves includes key entrances offset by the predetermined angle;
wherein each of the plurality of grooves has a first portion in which the thickness decreases from the key entrance and a second portion connected to the first portion, the second portion having a greater thickness than a point of connection with the first portion,
a back plate bail including:
a base extending outwardly from the second circumferential wall of the back plate and including a varying width;
two protruding portions protruding outwardly from the base positioned to provide a seat location for the latch;
a bump disposed closer to the back plate than the two protruding portions;
wherein the key portions on the circumferential wall of the face plate are positioned to match the positions of the key entrances of the plurality of grooves on the back plate,
wherein when the key portions on the face plate are positioned over the key entrances, and the face plate is rotated with respect to the back plate so that the key portions rest on a top surface of the second portion of the grooves, the pendant enters a primary locked position,
wherein when the latch is positioned between the two protruding portions of the back plate and resting on the seat location, the pendant enters a secondary locked position.

16. The pendant of claim 15, further comprising a circular pillbox having a diameter less than a diameter of the interior chamber of the back plate, the circular pillbox including:
a top cover portion with a circumferential wall extending therefrom;
a lower cover portion defining an internal chamber with the top cover potion, the lower cover portion including a circumferential wall having a diameter less than the diameter of the circumferential wall of the top cover portion; and
a plurality of cover key portions on the circumferential wall of the top cover portion protruding toward an interior, each of the plurality of cover key portions offset by a second predetermined angle; and
wherein the lower cover portion includes a plurality of grooves on the circumferential wall,
wherein the plurality of grooves includes cover key entrances offset by the second predetermined angle,
wherein when the cover key portions are positioned over the cover key entrances, and the top cover portion rotated with respect to the lower cover portion so that the cover key portions rest on a top surface of the grooves, the pillbox enters a locked position.

17. The pendant of claim 16, wherein when the pillbox is inserted in the interior chamber of the back plate with the top cover portion facing toward the face plate, the top cover portion is visible through the display portion of the face plate.

18. The pendant of claim 16, where each of the first and second predetermined angles is 90 degrees.

19. A pendant comprising:
a face plate including:
a circumferential wall extending from a rear side of the face plate in a thickness direction perpendicular from the face plate and including a beveled edge surface;
a first circumferential step extending from an interior of the circumferential wall toward a center of the face plate;
a second circumferential step extending from an interior of the circumferential wall toward the center of the face plate to define an opening display portion on a front side of the face plate and a seat on a rear side, the second circumferential step extending further to the interior than the first circumferential step;
a plurality of key portions on the circumferential wall protruding toward the interior of the face plate and disposed below the first circumferential step, each of the plurality of key portions offset by a predetermined angle;
a back plate including:
a first circumferential wall defining an inner chamber;
a second circumferential wall having a diameter greater than the first circumferential wall and a height less than that of the first circumferential wall to define a beveled edge surface;
an O-ring resting on the beveled edge surface;
wherein an outer portion of the first circumferential wall above the second circumferential wall includes a plurality of grooves, wherein the plurality of grooves includes key entrances offset by the predetermined angle;

wherein each of the plurality of grooves has a first portion in which the thickness decreases from the key entrance and a second portion connected to the first portion, the second portion having a greater thickness than a point of connection with the first portion, a circular pillbox having a diameter less than a diameter of the interior chamber of the back plate, the circular pillbox including:

a top cover portion with a circumferential wall extending therefrom;

a lower cover portion defining an internal chamber with the top cover portion, the lower cover portion including a circumferential wall having a diameter less than the diameter of the circumferential wall of the top cover portion; and a plurality of key portions on the circumferential wall of the top cover portion protruding toward an interior, each of the plurality of key portions offset by a second predetermined angle, wherein the lower cover portion includes a plurality of grooves on the circumferential wall, wherein the plurality of grooves includes insert key entrances offset by the second predetermined angle, wherein when the key portions are positioned over the key entrances, and the top cover portion rotated with respect to the lower cover portion so that the key portions of the top cover portion rest on a top surface of the grooves, the pillbox enters a locked position, wherein when the key portions on the face plate are positioned over the key entrances of the back plate, and the face plate rotated with respect to the back plate so that the key portions of the face plate rest on a top surface of the second portion of the grooves, the pendant enters a primary locked position.

20. The pendant of claim 19, further comprising:

a face plate bail including:

a base extending outwardly from the face plate and including a varying width;

two protruding portions protruding in the thickness direction;

a rod disposed in holes of the two protruding portions;

a bushing on the rod between the two protruding portions;

a latch fixed on the bushing between the two protruding portions; and a bump disposed on a narrower portion of the base than the two protruding portions and closer to the face plate than the two protruding portions;

a back plate bail including:

a base extending outwardly from the second circumferential wall of the back plate and including a varying width;

two protruding portions protruding outwardly from the base positioned to provide a seat location for the latch;

a bump disposed closer to the back plate than the two protruding portions;

wherein the key portions on the circumferential wall of the face plate are positioned to match the positions of the key entrances of the plurality of grooves on the back plate, wherein when the latch is positioned between the two protruding portions of the back plate and resting on the seat location, the pendant enters a secondary locked position.

* * * * *